United States Patent [19]

Tamura

[11] Patent Number: 4,745,403
[45] Date of Patent: May 17, 1988

[54] CONTROLLER FOR A LIQUID CRYSTAL DISPLAY

[75] Inventor: Kouichi Tamura, Ohtsu, Japan

[73] Assignee: Nippondenso Co., Ltd., Kariya, Japan

[21] Appl. No.: 877,715

[22] Filed: Jun. 23, 1986

Related U.S. Application Data

[63] Continuation of Ser. No. 511,006, Jul. 5, 1983, abandoned.

[30] Foreign Application Priority Data

Jul. 8, 1982 [JP] Japan ................ 57-118764

[51] Int. Cl.$^4$ .................................... G09G 3/36
[52] U.S. Cl. .................... 340/713; 340/765; 340/791; 340/805
[58] Field of Search ........... 340/713, 714, 784, 805, 340/791, 765; 350/331 T, 330

[56] References Cited

U.S. PATENT DOCUMENTS

| 3,921,162 | 11/1975 | Fukai et al. | 350/331 T X |
| 4,045,791 | 8/1977 | Fukai et al. | 340/784 X |
| 4,057,325 | 11/1977 | Kondo | 350/331 T X |
| 4,242,679 | 12/1980 | Morozum et al. | 350/331 T X |
| 4,298,866 | 11/1987 | Hodemaekes | 350/331 T X |
| 4,338,600 | 7/1982 | Leach | 350/331 T X |
| 4,385,294 | 5/1983 | Miles | 340/713 X |
| 4,390,874 | 6/1983 | Woodside et al. | 350/33 T X |
| 4,419,654 | 12/1983 | Funk | 340/62 X |
| 4,462,027 | 7/1984 | Lloyd | 340/784 |

FOREIGN PATENT DOCUMENTS

54-119897 9/1979 Japan .

Primary Examiner—Marshall M. Curtis
Attorney, Agent, or Firm—Cushman, Darby & Cushman

[57] ABSTRACT

A controller for a liquid crystal display has temperature detecting means which detect a temperature of the liquid crystal. Signal processing means which are connected to the temperature detecting means controls the timing of application of driving voltage to picture elements is delayed by a predetermined time in accordance with the temperature, in such a manner that a rise curve of the voltage response characteristic for light transmittances in those picture elements and a fall curve thereof pass through a common threshold of light transmittance at the same time. Driving voltages generating means connected to the signal processing means drives the liquid crystal display based on the control signal from the signal processing means. The controller can prevent display errors based on lowering of the voltage response of liquid crystal at a lower temperature range, and particularly can prevent transitional display errors caused by display switching.

9 Claims, 5 Drawing Sheets

CONTROLLER FOR A LIQUID CRYSTAL DISPLAY

This is a continuation of application Ser. No. 511,006, filed July 5, 1983, which was abandoned upon the filing hereof.

BACKGROUND OF THE INVENTION

1. Field of the Invention

This invention relates to a controller for a liquid crystal display which eliminates any errors or lowering of contrast, caused by the variation of a liquid crystal temperature. More particularly, it relates to a controller for a liquid crystal display which can prevent displaying errors to be caused by increase in a response time of the liquid crystal display at a low temperature.

2. Description of the Prior Art

A statically driven system using a segment type display will be explained hereinafter as one example, with respect to a waveform of a driving voltage applied to a conventional liquid crystal display and the changes of the image on its display screen.

Figure 2:
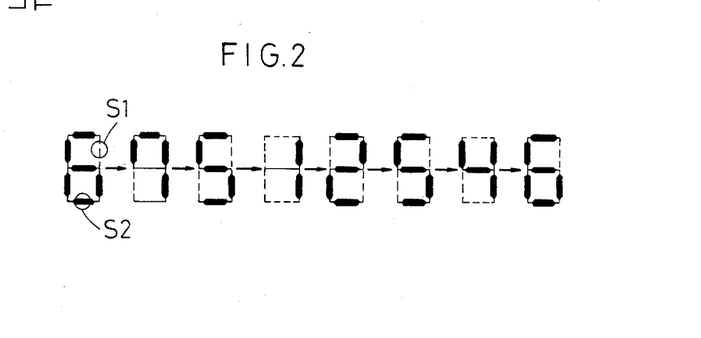
FIG. 2 is an explanatory drawing illustrating segments on a screen of a liquid crystal display and changes of the image thereon.

Assume that the image on the display screen of the liquid crystal display is varying at a predetermined time interval, such as 6-7-5-1 - - - , as shown in FIG. 2.

Figure 1:
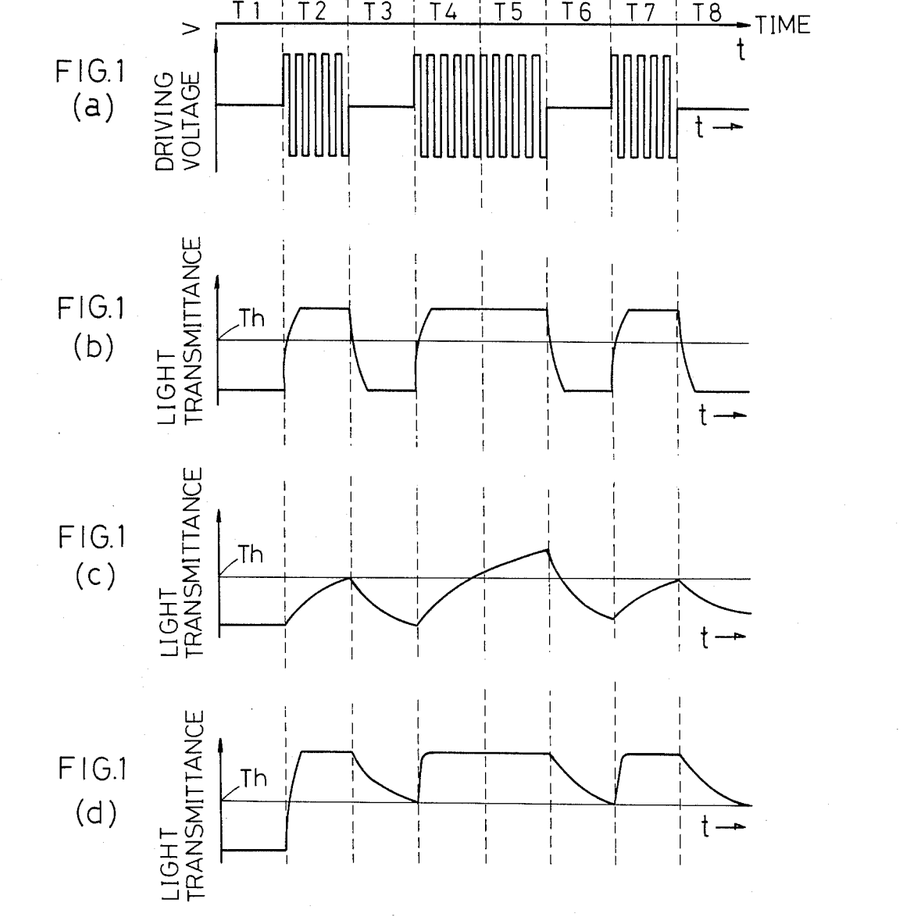
FIG. 1(a) illustrates a driving voltage waveform in the prior art.
FIG. 1(b) illustrates a voltage response characteristic for light transmittance of liquid crystal in case that the aforesaid voltage shown in FIG. 1(a) is applied at a room temperature.
FIG. 1(c) illustrates a voltage response characteristic for light transmittance of liquid crystal at a low temperature.
FIG. 1(d) illustrates a voltage response characteristic for light transmittance of liquid crystal at a low temperature in case that the effective value of driving voltage is increased more than that at a room temperature.

A waveform of a driving voltage to be applied to S1 segment on the display screen is shown in FIG. 1(a). The driving voltage is applied across a transparent electrode at the front of the display panel and a common electrode at the back thereof. In this case, an alternating current driving voltage is applied thereto for a certain period, which has a square waveform and a predetermined frequency. During the application of its driving voltage, the S1 segment of the liquid crystal screen increases its light transmittance so that the S1 segment comes to be visible.

FIG. 1(b) illustrates a voltage response characteristic which shows the variation of light transmittance of liquid crystal in the S1 segment when the voltage of FIG. 1(a) is applied thereto, wherein the ordinate axis shows light transmittance, and the abscissa axis shows time. In this case, a reference level Th shows a threshold and if the light transmittance is in excess of Th, it can be recognized that the S1 segment is in a visible state.

As is apparent from the voltage response characteristic shown in FIG. 1(b), if the rise and fall times of the light transmittance are extremely short, as compared with a switching period of the image, the light transmittance can respond to the envelope of the driving voltage waveform with adequate accuracy.

In such a case, therefore, the visual condition on the display screen can be switched at a predetermined time interval as shown in FIG. 2, so that there is no problem of displaying errors.

On the other hand, however, liquid crystal has such a physical property that the responsiveness of its light transmittance to the driving voltage is lowered as its temperature comes down. In other words, either of the rise and fall times in the voltage response characteristic is increased in proportion to an exponential function of a reciprocal absolute temperature, and therefore, at an extremely low temperature, the voltage response characteristic can be shown by such a curve as illustrated in FIG. 1(c).

As is known from this characteristic figure shown in FIG. 1(c), the voltage response characteristic curve of light transmittance in liquid crystal cannot exceed the thereshold Th in the time block T2, although a driving voltage is applied thereto. This voltage response characteristic curve goes into the next time block T3 in which a driving voltage is not applied, before it exceeds the threshold Th.

Therefore, the S1 segment, which ought to be in a visible state in the time block T2, cannot be visible in this case. In the same manner as described above, it is evident that the S1 segment is not visible either, in the blocks T4 and T7.

Thus, since the voltage responsibility of the light transmittance is lowered at a low temperature, it is impossible for the visual condition to be changed at a predetermined period. As a result, display errors or lowering of contrast may be encountered.

As to liquid crystal, it has also been known that the rise time in the voltage response characteristic decreases in proportion to the value of a driving electric field applied in the inside of liquid crystal.

Taking notice of this fact, such a method can be supposed that under a low temperature, a voltage to be applied thereto is increased as compared with the voltage value in the case of a usual temperature thereof. However, the fall time in the voltage response characteristic is scarcely concerned with the effective value of the electric field inside of the liquid crystal. Therefore, even if a large amount of voltage is applied to operate the liquid crystal, the voltage response characteristic curve for its light transmittance is only as shown in FIG. 1(d).

In this case, in a time block T2 in which a voltage is applied, the light transmittance can sufficiently respond to the applied voltage within the predetermined time after a voltage application. In a time block T3, however, if the voltage is eliminated, the fall curve thereof cannot pass through the threshold Th within the time block T3, because the fall time thereof is more than twice as long as the predetermined period for switching a visual condition.

As a result, the S1 segment continues to be visible in the time block T3 though the display ought to disappear therein. Then, at the following time block T4, a voltage for display is also applied.

In this case, therefore, the visible state of the S1 segment is continued in all of the respective time blocks T2, T3, T4, T5, T6, T7 and T8 with no disappearance, and it is impossible to change the visual condition of S1 segment at the same period with that of the foresaid time block.

Thus, under a low temperature, even if the peek value of the applied voltage is increased, such a displaying error cannot be improved.

Accordingly, if the voltage is applied and stopped for the same period, such a display error, as described above in the prior art, is transitionally caused at the time when a display is switched, because of the difference between the rise time and the fall time of the voltage response characteristic curve. On the other hand, if the display is switched within the shorter period than the fall time in the voltage response characteristic, the aforesaid display error will necessarily be also caused.

SUMMARY OF THE INVENTION

In order to overcome the aforesaid disadvantages in the prior art, the present invention has been developed.

Accordingly, one object of the present invention is to provide a controller for a liquid crystal display wherein turning on one segment or turning off the other segment, that is, a visible state or a non-visible state in each segment, is by simultaneously switching at a predetermined period by delaying the application timing of a driving voltage from the elimination timing thereof for a certain time.

Another object of the present invention is to provide a controller for a liquid crystal display which can prevent a display error based on lowered voltage responsiveness of liquid crystal at a low temperature.

A further object of the present invention is to provide a controller for a liquid crystal display which can prevent a transitional display error caused at the time when a display is switched at a low temperature, therefore to provide a controller for a liquid crystal display which can be used in a wide temperature range.

A still further object of the present invention is to provide a controller for a liquid crystal display which can shorten the switching period of display to about ½ of the fall time of a voltage response characteristic at a low temperature.

The foregoing and other objects are effected by the invention, as is apparent from the following description and claims.

BRIEF DESCRIPTION OF THE DRAWINGS

The above and other features and advantages of the present invention will become more apparent from the following description when considered in connection with the accompanying drawings wherein.

DETAILED DESCRIPTION OF THE INVENTION

The present invention has provides a controller for a liquid crystal display which detects a temperature of liquid crystal, calculates the rise and fall times in a voltage response characteristic for light transmittance of the liquid crystal based on the detected temperature thereof, and delays an application timing of a driving voltage for a predetermined period of time from an elimination timing thereof, in accordance with the aforesaid calculated value whereby the timing of turning on one segment and that of turning off the other segment are equal, that is, a visible state and non-visible state in the respective segments are simultaneously switched to each other at a predetermined period.

More particularly, the controller for a liquid crystal display according to the present invention comprises:

temperature detecting means for detecting a liquid crystal temperature of the liquid crystal display;

signal processing means for inputting the detected signal from the temperature detecting means, calculating a rise time in a voltage response characteristic for light transmittance of the liquid crystal at the time when a step driving voltage is applied and a fall time thereof at the time when it is eliminated, based on the aforesaid temperature signal, computing a delay time for which the application timing of a driving voltage is to be delayed from the elimination timing thereof in accordance with the calculated values of the aforesaid rise and fall times in such a manner that when a switching of display in each picture element on the display screen of the liquid crystal display is made by an application and elimination of a driving voltage, both of the voltage response characteristic curves for light transmittance, in a picture element where a driving voltage is turned from an elimination condition to an application condition and in another visual element where it is turned from an applying condition to an eliminating condition, pass through the threshold for light transmittance, by which a visible and non-visible can be distinguished, at almost the same time, and outputting control signals for an elimination and an application of a driving voltage in accordance with the aforesaid delay time; and driving voltage generating means for generating a driving voltage to operate the liquid crystal display based on the control signals from the aforesaid signal processing means.

According to the controller of the present invention, nematic liquid crystal, cholesteric liquid crystal, smectic liquid crystal or the like may be employed for liquid crystal to be operated, but it is not limited to the aforesaid liquid crystals.

Whereas, as temperature detecting means, for example, a thermal-electric transducer such as a thermistor or the like may be employed. In addition thereto, either of a positive type display in which the light transmittance of liquid crystal is decreased at the time when a driving voltage is applied thereto and a negative type display in which it is increased at the time when a driving voltage is applied thereto, may be also employed for this purpose.

In a word, the controller for a liquid crystal display according to the present invention controls an application timing of a driving voltage into a picture element to which no driving voltage is applied so as to be delayed for a certain time from an elimination timing of the driving voltage applied to other picture element when the indication of liquid crystal is switched, whereby a fall curve in the voltage response characteristic of its light transmittance in a picture element wherein the applied voltage is eliminated and a rise curve thereof in another picture element wherein a voltage is applied, pass through the threshold Th having a common light transmittance at the same time.

Hereinafter, as one example of the aforesaid signal processing means, a statically driven system with a segment type display and also a negative type display will be explained.

Figure 3:
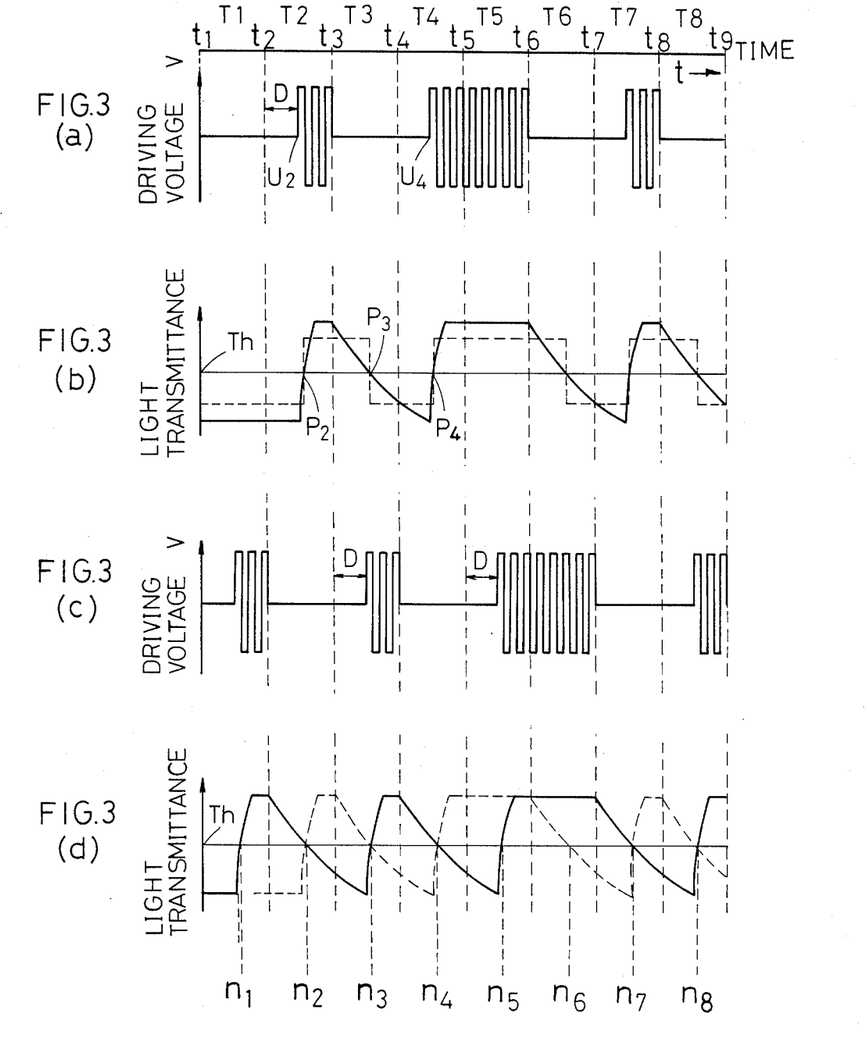
FIG. 3(a) illustrates a driving voltage waveform according to the present invention, which is to be applied to one segment.
FIG. 3(b) illustrates a voltage response characteristic for light transmittance of liquid crystal in the segment which is operated by the aforesaid driving voltage waveform shown in FIG. 3(a)
FIG. 3(c) illustrates a driving voltage waveform to be applied to the other segment.
FIG. 3(d) illustrates a voltage response characteristic for light transmittance of the segment to be operated by applying the driving voltage shown in FIG. 3(c) thereto.

FIG. 3(a) illustrates a driving voltage waveform to be applied to S1 segment when switching of numerical values as shown in FIG. 2 are made by a controller according to the present invention.

The driving voltage waveform according to the present invention is different from that of the prior art in the following points. Namely, in the prior art, a driving voltage is applied at the respective timings of t1, t2, t3 - - -. On the other hand, in the present invention, the respective application timings of a driving voltage are delayed for a predetermined time D compared with the respective timings t1, t2, t3 - - - in the prior art, but the respective elimination timings thereof are at the same time as the respective timings in the prior art.

If a liquid crystal display is driven with the waveform according to the present invention, the voltage response characteristic for light transmittance in S1 segment is as shown by a continuous line in FIG. 3(b).

In this case, if a driving voltage is applied (at a point of U2) in time block T2 with a delay for the predetermined time D, the light transmittance of the segment is immediately saturated as shown in FIG. 3(b), because the rise time thereof is short. As a result, the S1 segment is switched to visible state at the point of P2 in time block T2. But, if the driving voltage is cut off at the timing of t3, the light transmittance thereof is varied along the fall curve as shown in FIG. 3(b). As a result, the S1 segment is switched from the visible state to a nonvisible state at the point of P3 in time block T3, and it is maintained in such a non-visible state until a driving voltage is applied at a point of U4 in the next time block T4 and the light transmittance thereof reaches a point of P4.

FIG. 3(c) illustrates a driving voltage waveform to be applied to another S2 segment shown in FIG. 2. The voltage response characteristic for light transmittance in the S2 segment is illustrated by a continuous line in FIG. 3(d). In addition to this continuous line, a broken line (corresponding to S1 segment), which shows the characteristic of FIG. 3(b), is also illustrated in FIG. 3(d).

As is known from FIG. 3(d), S1 and S2 segments are simultaneously switched from a visible condition to a non-visible state or inversely, from the non-visible state to the visible condition at the respective timings of n1, n2, n3, n4 - - -, respectively.

Thus, since the respective switchings of the display in each segment are simultaneously made, display errors which will be transitionally caused when the visual condition in each segment is switched, can be prevented. Further, in case that the visual condition is switched at a predetermined period, such a displaying error can be also prevented and the switching of the visual condition can also synchronize with the driving voltage applied to each segment. Moreover, the aforesaid system can be employed in such a low temperature range that a time interval from timing for the voltage eliminating till the timing for fall curve passing through the threshold Th is nearly equal to the switching period. In other words, It is possible to shorten the switching period of display to about ½ period of the fall time in the voltage response characteristic curve.

The delay time D can be obtained as follows.

The rise time $\alpha r$ and the fall time $\alpha d$ can be expressed by the following formulas:

$$\alpha r \alpha \eta d^2/(\Delta \epsilon \cdot V^2 - \pi^2 K) \quad (1)$$

$$\alpha d \alpha \eta d^2/\pi^2 K \quad (2)$$

wherein $\eta$, d, V, K respectively show coefficient of viscosity, cell thickness, effective value of an applied voltage and elastic constant and $\Delta \epsilon$ shows the difference between the dielectric constant in the longitudinal axial direction of liquid crystal molecule and that in the transverse axial direction thereof.

In this case, a factor having a great dependence on temperature is coefficient of viscosity and it can be expressed by the following formula:

$$\eta = C \exp(1/T) \quad (3)$$

wherein C is a proportional constant and T is absolute temperature, and therefore:

$$\alpha r = A \exp(1/T) \quad (4)$$

$$\alpha d = B \exp(1/T) \quad (5)$$

wherein A and B show proportional constants, respectively. They can be obtained by an experiment.

In this manner, after $\alpha r$ and $\alpha d$ are obtained, a rise curve f(t) and fall curve g(t) in the voltage response characteristic for a light transmittance can be expressed by the following formulas, respectively, but $\alpha r'$ and $\alpha d'$ show time constants of the aforesaid curves, respectively:

$$f(t) = 1 - 2 \exp((t-D)/-\alpha r') \quad (6)$$

$$g(t) = 2 \exp(-t/\alpha d') - 1 \quad (7)$$

In this case, for simplification, a maximum value of the light transmittance of liquid crystal and a minimum value thereof are normalized to 1 and $-1$, respectively. If the normalized threshold Th of the light transmittance is M, the delay time D can be expressed as follows:

by defining $f(t) = g(t) = M$, $$t - D = -\alpha r' \cdot \ln((1-M)/2) \quad (8)$$

$$t = -\alpha d' \cdot \ln((1+M/2) \quad (9)$$

therefore,
$$D = \alpha r' \cdot \ln((1-M)/2) - \alpha d' \cdot \ln((1+M)/2).$$

Where, if M=0, $$D = (\alpha d' - \alpha r') \cdot \ln 2.$$

If the aforesaid formula is expressed with a rise time $\alpha r$ and a fall time $\alpha d$, it can be expressed as follows:

$$D = (\alpha d - \alpha r) \ln 2/2.2 = 0.4(\alpha d - \alpha r) \quad (10)$$

As described above, the delay time D can be obtained.

Having generally described this invention, a further understanding can be obtained by reference to a certain specific embodiment which is provided herein for purpose of illustration only and is not intended to be limiting unless otherwise specified.

In this embodiment according to the present invention, a speed display, which indicates a vehicle speed periodically, is described as one example.

Figure 4:
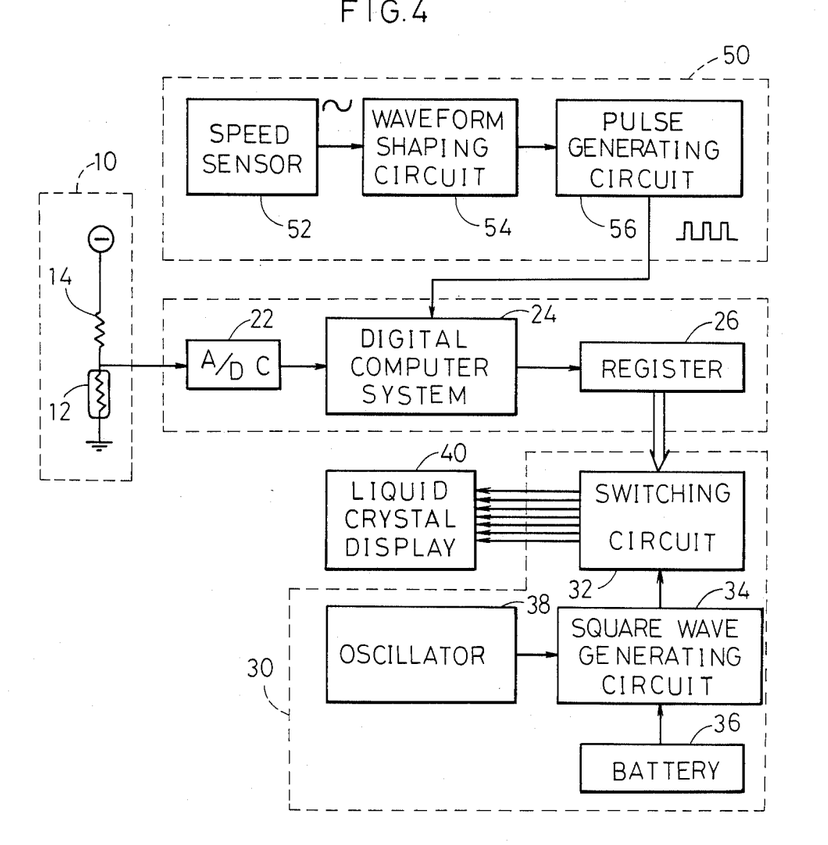
FIG. 4 is a block diagram illustrating an embodiment according to the present invention.

FIG. 4 is a block diagram illustrating the construction of a controller for a liquid crystal display according to this embodiment.

The speed display according to this embodiment comprises temperature detecting means 10 for detecting a temperature of liquid crystal; signal processing means 20 for receiving the aforesaid detected signal therein and processing its signal in a predetermined manner; driving voltage generating means 30 for driving a liquid crystal display 40 based on a control signal output of the aforesaid signal processing means 20; and the liquid crystal display 40 for receiving a driving voltage and displaying or indicating a vehicle speed. The controller of this embodiment further comprises a data input device 50 for generating speed data to indicate the speed of a vehicle, particularly used in this embodiment.

Figure 5:
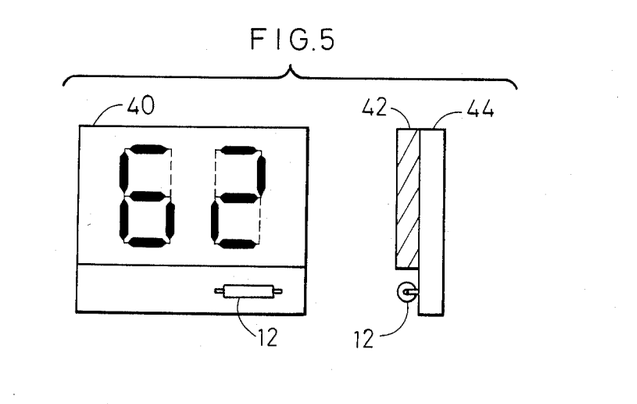
FIG. 5 is an explanatory drawing illustrating a liquid crystal display and position where detecting means are to be mounted, according to the embodiment of the present invention, respectively.

The temperature detecting means 10 comprises a fixed resistor 14 and a thermistor 12 connected thereto in series, and it sends a voltage signal in accordance with a temperature variaton of liquid crystal to the following A/D converter 22. The thermistor 12 is fixed to one end face of a fixing plate 44 of the liquid crystal display 40, as shown in FIG. 5, to detect a temperature of liquid crystal.

The temperature analog signal inputted into the A/D converter 22 is converted to a digital signal to be sent to a digital computer system 24 connected to the converter 22.

In this case, the digital computer system stands for such a system that is provided with input interfaces, C.P.U. (Central Processing Unit), memories, output interfaces and the like.

The signal processed in the digital computer system 24 is coupled to the following register 26. To the register 26, are sent selection data signals for a group of segments, on the liquid crystal screen, which determines their conditions to be visible or to be non-visible.

The selection data signal is coupled to a switching circuit 32 via register 26. The switching circuit 32 receives a square wave signal with a predetermined switching frequency, from a square wave voltage generating circuit 34 connected with the switching circuit 32.

The square wave generating circuit 34 receives a signal output from an oscillator 38 as an input signal for its gate, and converts a DC voltage, which is stepped up by a DC chopper control circuit (not shown) through a battery 36 mounted on a vehicle, into a square wave synchronizing with the signal output of the oscillator 38, that is, the oscillator 38 produce a modulating signal to produce a driving voltage for a liquid crystal display. Then, the modulated square wave voltage is inputted into the switching circuit 32, while the switching circuit 32 receives also the selection data signal from the register 26 as a gate signal input thereof, thereby to control passing of the square wave voltage received from the circuit 34 through to the output terminal, or to cut it off in accordance with its gate condition. As a result, the driving voltage is applied to only such selected segments in the liquid crystal display.

On the other hand, the data input device 50 for a vehicle speed data therein comprises the following constructions.

Namely, in this device 50, a speed sensor 52 is fixed to an axle of the vehicle and puts out a sine wave signal with the frequency proportional to the vehicle speed by utilizing an electromagnetic connection. The sine wave signal output of the speed sensor 52 is coupled to a waveform shaping circuit 54 to be converted into a square wave with the same frequency with that of the sine wave signal. Then, the aforesaid square wave is inputted into a pulse generating circuit 56 connected to the waveform shaping circuit 54 to generate a pulse signal every one cycle of the square wave of the speed signal. The aforesaid pulse signal is inputted in C.P.U. so as to interrupt the processing of C.P.U. in the digital computer system 24 in the signal processing means 20.

Hereinafter, processing flow of the digital computer system 24 will be explained.

Figure 6:
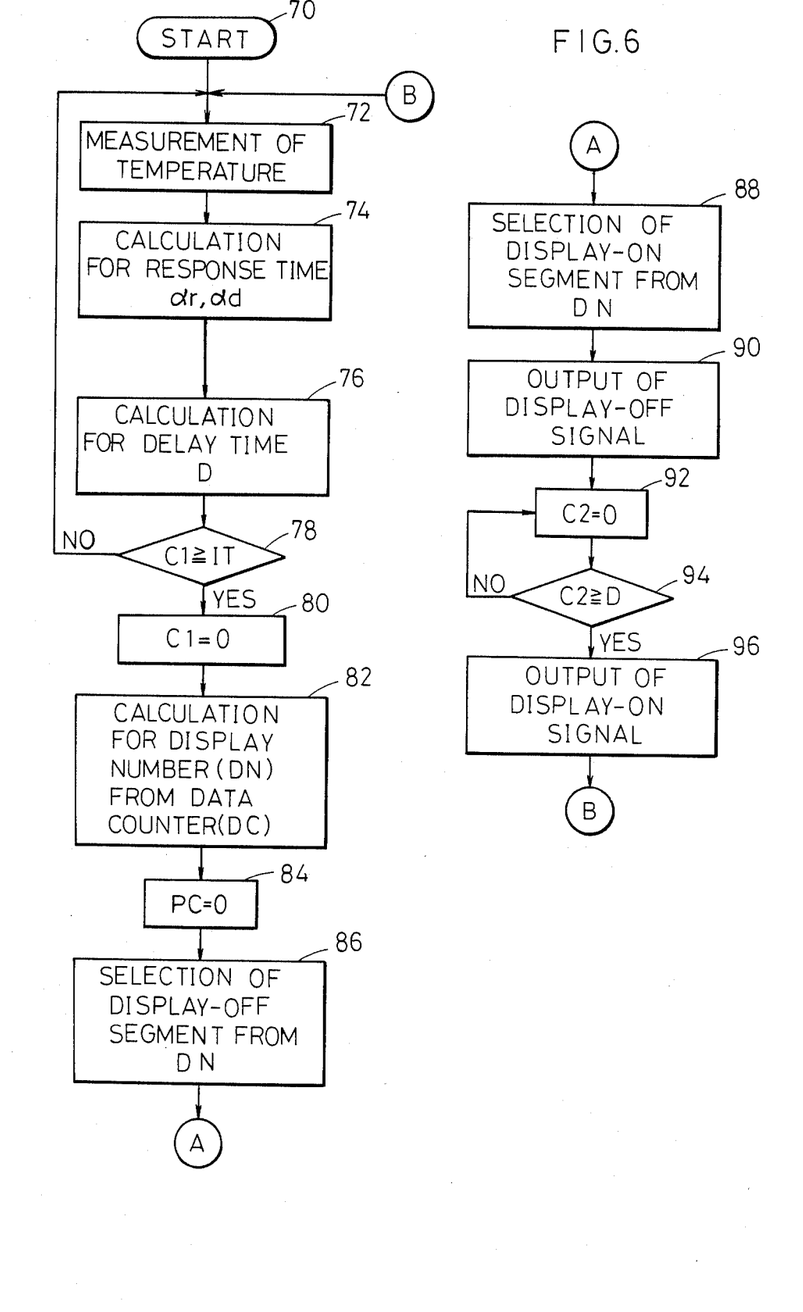
FIGS. 6, 7 and 8 show respectively flowcharts of software in a computer system employed in the embodiment according to the present invention.

FIG. 6 illustrates a flowchart of the computer process.

When an engine key is turned ON, execution is started from a main program 70 in the computer system 24. At a first step 72, a temperature of liquid crystal is detected by the temperature detecting means 10 and C.P.U. reads the temperature data converted by A/D converter 22, then stores them in the memory. A second step 74 connected to the aforesaid first step 72 is a step to calculate a rise time $\alpha r$ and fall time $\alpha d$ in accordance with the temperature detected by the first step 72 and based on the foregoing fomulas (4) and (5). Then, at a third step 76 connected to the second step 74, calculation for a predetermined delay time D is executed. The delay D can be obtained from the foregoing formula (10).

A fourth step 78 connected to the third step 76 is a step to judge whether the display interval time counter C1, which will be explained hereinafter, is in excess of a predetermined display interval time IT. If excessive, the processing therein moves to a fifth step 80 connected to the step 78. On the other hand, if not excessive, it returns to the first step 72 to execute again the aforesaid processings. At the fourth step 78, if the display interval time counter C1 exceeds the predetermined interval time IT, a new display must be made. Namely, this case shows that the switching time for display has come. At the fifth step 80, C.P.U. clears off the display interval time counter C1 in order to count the next display interval time. At a sixth step 82 connected to the fifth step 80, as will be described later, there is carried out calculation for a display data number (DN) to be displayed in the liquid crystal display from a value of data counter (DC) for detecting a vehicle speed. For example, by multiplying the value of the data counter (DC) by a proportional constant, if the vehicle speed is actually 60 Km/h, the display data number of 60 is calculated corresponding to it. At a seventh step 84 connected to the sixth step 82, this display data number (DN) is cleared off to prepare the next display. At an eighth step 86 connected to the step 84, such a group of segments that their condition must be non-visible (OFF) is selected in accordance with display data number (DN). While, in the following ninth step 88, the other group of segments such that their condition must be visible (ON) is selected in accordance with the DN value as described above. And then, at the following tenth step 90, there is sent a signal for eliminating the voltage having been applied to the segment wherein the display condition is to be turned OFF. This elimination signal is sent therefrom to the register 26 to eliminate the applied voltage through the switching circuit 32 wherein the elimination signal is inputted in as a gate signal input thereof. In an eleventh step 92, a counter C2 for counting a delay time D, i.e., an application timing of a driving voltage, is cleared. And at the next twelveth step 94, C.P.U. dynamically stops, until the value of the 10 counter C2 counted by an interruption subroutine which will be explained hereinafter, reaches the predetermined delay time D calculated in the aforesaid step 76. After it reaches the predetermined time D, the execution is moved to the next thirteenth step 96 and wherein a signal for applying a driving voltage to the aforesaid group of segments in which the segment display condition should be turned ON, is outputted. Whereby, the switch of one display screen can be accomplished and then, the execution in this system is returned to the first step to prepare the next display.

Figure 7:
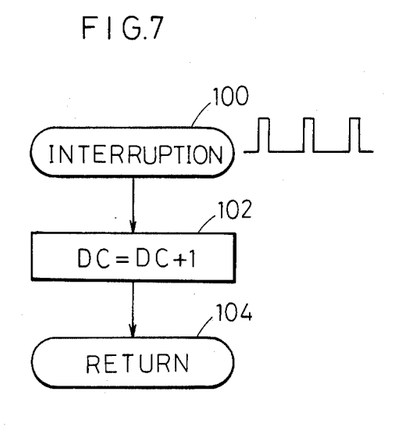
Figure 8:
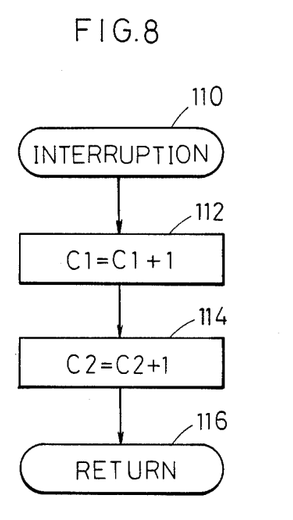

FIGS. 7 and 8 are respectively flowcharts of the aforesaid interruption subroutine.

In FIG. 7, the pulse signal output of the pulse generating circuit 56 interrupts the C.P.U. processing in the aforesaid main program. In result, this interruption subprogram is started from the step 100. At a step 102 connected to the step 100, the aforesaid display counter DC counts the aforesaid pulse signal one by one at every interruption. Therefore, the display data counter DC at the moment that the step 82 is carried out, indicates the value proportional to the vehicle speed detected by the speed sensor 52.

FIG. 8 shows the second interruption subprogram for counting the display time interval (C1) to switch the display screen and counting the delay time (C2) for the driving voltage to be applied.

At steps 112 and 114, both of the aforesaid counters C1, C2 are added by one every interruption, respectively.

This subprogram is started by interruption to C.P.U. with an extremely short predetermined time interval compared with the predetermined display time interval IT.

Thus, the present invention takes, when an application and elimination of a driving voltage are switched to each other, a construction as to delay an application timing of the driving voltage for a predetermined time than an elimination timing thereof, whereby to let the fall and rise curves of the voltage response characteristic simultaneously pass through the threshold for light transmittance.

Since the present invention has the aforesaid construction, it can prevent display errors due to lowering of the voltage responsiveness in the light transmittance of liquid crystal at a lower temperature. In other words, a transitional displaying error to be caused at the time when display is switched can be prevented. Further, it is also possible to shorten the switching period of display to about ½ period of the fall time.

What is claimed as new and intended to be covered by Letters Patent is:

1. A controller for a liquid crystal display having picture elements which comprises:

temperature detecting means for detecing a temperature of the liquid crystal display and producing a temperature signal indicative thereof;

driving voltage generating means for producing a driving voltage and selectively applying said driving voltage to the picture elements of the liquid crystal display so that, during actuation intervals, each picture element is in either a voltage-applied condition when said driving voltage is applied thereto, and is in a no-voltage-applied condition when no driving voltage is applied thereto;

signal processing means, connected to said temperature detecting means to receive said temperature signal, for producing a control signal output to control a timing of said driving voltage producing of said driving voltage generating means, thereby controlling a timing of initiation of said voltage-applied condition of selected picture elements;

said signal processing means including delay calculating means, receiving said temperature signal, for calculating a fall time of said driving voltage on a picture element and a temperature-dependant delay relative to said fall time, said signal processing means for delaying the initiation of said voltage-applied condition of selected picture elements based on said temperature-dependent delay, to those of said picture elements which were in said no-voltage-applied condition during the preceding actuation interval such that a rise curve of a voltage response characteristic for light transmittance of said those picture elements switched to said voltage-applied condition, and a fall curve of picture elements switched to said no-voltage-applied condition respectively pass through a predetermined level of light transmittance at the same time and actuation intervals are maintained constant over a wide temperature range;

said delay being relative to the time of elimination of driving voltage to picture elements which have driving voltage applied thereto.

2. A controller for a liquid crystal display according to claim 1, wherein said temperature detecting means comprise a thermal-electric transducing element.

3. A controller for a liquid crystal display according to claim 1, further comprising a vehicle, and a vehicle data input device connected to said vehicle, connected to said signal processing means, for receiving speed data and indicating a vehicle speed based on said speed data.

4. A controller for a liquid crystal display according to claim 3, wherein said temperature detecting means comprises a fixed resistor and a thermistor connected to said resistor in series, for generating an analog temperature signal;

and said signal processing means comprises:

(a) an A/D converter for converting said analog temperature signal into a digital signal;

(b) a digital computer system connected to said A/D converter, and including said delay calculating means for processing said digital signal to produce said control signal output based on said calculated temperature-dependent delay, said digital computer system being provided with interfaces, a C.P.U., memory devices and output interfaces therein; and (c) register means, connected to said digital computer system, for receiving said control signals from said digital computer system, and selecting a first group of picture elements whose conditions are visible or ON and a second group of picture elements whose conditions are non-visible or;

wherein said driving voltage generating means comprises a switching circuit, a square wave voltage generating circuit connected to said switching circuit at one terminal thereof, an oscillator which oscillates at a predetermined frequency connected to another terminal of said square wave voltage generating circuit, and a battery mounted on said vehicle and connected to the other terminal of said square wave voltage generating circuit, said square wave voltage generating circuit receiving a signal output of said oscillator as a gate input thereof and converting a voltage, which is set up by a direct current chopper control circuit through said battery, into a square wave in synchronization with said signal output received from the oscillator;

said switching circuit receiving said square wave voltage from said square wave voltage generating circuit and receiving also an output signal from said register in the signal processing means as a gate input thereof, to control outputting said square wave voltage in accordance with a condition of said gate, said square wave voltage being applied to only a group of selected picture elements in the liquid crystal display which are commanded to said voltage-applied condition; and said data input device comprises:

(a) a vehicle speed sensor mounted to an axle of said vehicle for generating a sine wave signal in proportion to said vehicle speed, (b) a waveform shaping circuit connected to said speed sensor, for converting said sine wave signal into a square wave with a same frequency as that of said sine wave signal, and (c) a pulse generating circuit connected to said waveform shaping circuit, for generating a pulse signal corresponding to one cycle of said square wave, said pulse signal being connected to an interrupt input of said C.P.U., to interrupt processing of said C.P.U. in said digital computer system in the signal processing means.

5. A controller for a liquid crystal display according to claim 4, wherein
said thermistor of the temperature detecting means is fixed to one end surface of a fixing plate of the liquid crystal display thereby to detect the liquid crystal temperature.

6. A controller for a liquid crystal display in accordance with claim 10 wherein said display calculating means includes means for calculating, based on the temperature of the liquid crystal display, both a rise time in said voltage response characteristic for light transmittance of the liquid crystal display for application of a step voltage, and said fall time in said voltage response characteristic for removal of the step voltage, and means for calculating a delay time in accordance with said rise time and fall time, and for generating the control signal output to said driving voltage generating means in accordance with said delay time.

7. A controller for a liquid crystal display according to claim 1, further comprising:
a liquid crystal display; and
display means, coupled to said liquid crystal display, of a type selected from the group consisting of a segment type display, and a matrix type display.

8. The combination of claim 7 wherein said liquid crystal display employs display means selected from the group consisting of a positive type display for light transmittance and a negative type display for light transmittance.

9. In combination, a controller for a liquid crystal display according to claim 1, further comprising a liquid crystal display with a liquid crystal of a type selected from the group consisting of nematic liquid crystal, cholesteric liquid crystal, and smectic liquid crystal.

* * * * *

UNITED STATES PATENT AND TRADEMARK OFFICE
CERTIFICATE OF CORRECTION

PATENT NO. : 4,745,403

DATED : May 17, 1988

INVENTOR(S) : TAMURA

It is certified that error appears in the above-identified patent and that said Letters Patent is hereby corrected as shown below:

Col. 6, lines 10 and 12, $$\alpha r \propto \eta d^2 (\Delta \varepsilon \cdot V^2 - \pi^2 K) \qquad (1)$$

$$\alpha d \propto \eta d^2 / \pi^2 K \qquad (2)$$

Col. 7, line 28, change "variaton" to -- variation --

Claim 1, line 3, change "detecing" to -- detecting --

Claim 4, line 23, after "or" insert -- OFF --

Claim 6, line 2, change "claim 10" to -- claim 1 -- change "display" to -- delay --

Signed and Sealed this

Fourteenth Day of February, 1989

Attest:

DONALD J. QUIGG

Attesting Officer

Commissioner of Patents and Trademarks